US007966192B2

(12) United States Patent
Pagliari et al.

(10) Patent No.: US 7,966,192 B2
(45) Date of Patent: Jun. 21, 2011

(54) METHOD AND APPARATUS FOR PROCESSING ELECTRONIC DISPUTE DATA

(75) Inventors: Danial Pagliari, Sunrise, FL (US);
Carol York, Great Cacapon, WV (US);
Daniel Salvatore, Weston, FL (US);
Kelley Everetts, Greencastle, PA (US)

(73) Assignee: First Data Corporation, Greenwood Village, CO (US)

( * ) Notice: Subject to any disclaimer, the term of this patent is extended or adjusted under 35 U.S.C. 154(b) by 967 days.

(21) Appl. No.: 10/215,877

(22) Filed: Aug. 8, 2002

(65) Prior Publication Data

US 2003/0144866 A1 Jul. 31, 2003

Related U.S. Application Data

(60) Provisional application No. 60/353,805, filed on Jan. 30, 2002.

(51) Int. Cl.
*G06Q 10/00* (2006.01)
*G06Q 50/00* (2006.01)

(52) U.S. Cl. .......................................... 705/1.1; 705/311

(58) Field of Classification Search ................ 705/1, 26, 705/75, 76, 77, 78, 34, 40, 8, 9, 1.1, 311, 705/80

See application file for complete search history.

(56) References Cited

U.S. PATENT DOCUMENTS

| 6,128,603 | A | * | 10/2000 | Dent et al. ........................ 705/40 |
| 6,343,279 | B1 | * | 1/2002 | Bissonette et al. ............. 705/41 |
| 6,606,740 | B1 | * | 8/2003 | Lynn et al. ..................... 717/100 |
| 2002/0184123 | A1 | * | 12/2002 | Sijacic et al. .................. 705/34 |

FOREIGN PATENT DOCUMENTS

WO  WO 02/01523  *  1/2002
WO  WO/02/01523  *  1/2002

OTHER PUBLICATIONS

Waldmeir, Patti, E-business: credit card arbitrators fill cross-border legal vacuum, Financial Times; London, Mar. 9, 2000.*
Zhao, J. Leon and Stohr, Edward A., Temporal Workflow Management in a Claim Handling System, published in Proceedings of the International Joint Conference on Work Activities Coordination and Collaboration, Feb. 22-25, 1999.*
Waldmeir, Patti, E-business: credit card arbitrators fill cross-border legal vacuum, Financial Times; London, Mar. 9, 2000.*
Anonymous, Transaction Disputes Automated, Sep. 2000, Banking Technology, vol. 17, Iss. 7, p. 18.*
Appeal Brief Under 37 CFR §41.37 filed on Sep. 21, 2007, for U.S. Appl. No. 10/215,876.

* cited by examiner

*Primary Examiner* — Jamisue A Plucinski
*Assistant Examiner* — Fonya Long
(74) *Attorney, Agent, or Firm* — Kilpatrick Townsend & Stockton LLP

(57) ABSTRACT

One embodiment of the invention allows a merchant to obtain a request sent by an investigator for supporting documentation or information and reply with a scanned document in reply to the investigator's request. The investigator can then process the scanned document and/or merchant response and quickly and efficiently resolve a disputed payment transaction.

17 Claims, 36 Drawing Sheets

Worklist
| | | | | EXPIRED | | | | | |
|---|---|---|---|---|---|---|---|---|---|
| Chargebacks | Retrievals | | | | | | | | |
| | Due Date | Cardholder Number | Merchant Number | Amount | | Due Date | Cardholder Number | Merchant Number | Amount |
| | 07/17/00 | 4128000188000023 | 67611820000 | 78.95 | | 03/21/01 | 4226351258859601 | 67611820000 | 180.85 |
| | 02/01/01 | 5491130088004500 | 67611820000 | 146.90 | | 12/14/00 | 4417120067001800 | 67611820000 | 26.42 |
| | 01/10/01 | 5420390038005300 | 67611820000 | 39.95 | | | | | |
| | 02/09/01 | 4224180037370023 | 67611820000 | 52.16 | | | | | |
OUTSTANDING  Previous ◀ ▶ Next  WORKED  Previous ◀ ▶ Next
| | Date | User ID | Case Number | |
|---|---|---|---|---|
| ✔ | 12/14/00 | anyuser | CB020432258 | |
| ! | 08/27/01 | anyuser | RT304662891 | |
MY MESSAGES  Previous ◀ ▶ Next  MESSAGE VIEWER 
User Logged: mespino
Merchant #: 61523695545
001-001
Fig. 3

Worklist   Chargebacks   Retrievals
CB #010089977     RT #317920718     Case #3     Case #4     Case #5

Chargeback Information                                      🖨 Print          🔒 Release Case Action Code: EXPIRED          Reason Code: 90 / NON-RECEIPT OF MERCHANDISE

Name: XYZ COMPANY, INC., 1-888-555-1212, WITCHITAW, WI

Cardholder #: 4128000188000023          Merchant #: 67611820000

Due Date: 07/17/00          Request Date: 07/03/00          Processing Date: 05/03/00

Chargeback Amount: 78.95 USD          Transaction Date: 05/02/00          Chargeback Cycle: FIRST

Transaction Amount: 78.95 USD          Transaction Locator #: 0502 45021838

Foreign Amount:          Reference #: 24610430123078657066501

Category Code: 5964          Auth. Code: 881366          Case #: 010089977

Case # 000000000          Merchant Actions: [- Select One -]          Image: [         ] Browse
Letters
  advice                 Add Comments Here ↓          Description: [         ] Add
  bank_doc
                                                        Delete    salesdraft_00854698563254
                                                                  advice_00854698563254
                                                        Clear All User Logged:  mespino
                                          Merchant #:   61523695545
                                                                    001-002

Fig. 4

Chargeback Information

Action Code: EXPIRED  Reason Code: 90 / NON-RECEIPT OF MERCHANDISE

Name: XYZ COMPANY, INC., 1-888-555-1212, WITCHITAW, WI

Cardholder #: 4128000188000023  Merchant #: 67611820000

Due Date: 07/17/00  Request Date: 07/03/00  Processing Date: 05/03/00

Chargeback Amount: 78.95 USD  Transaction Date: 05/02/00  Chargeback Cycle: FIRST

Transaction Amount: 78.95 USD  Transaction Locator #: 0502 45021838

Foreign Amount:  Reference #: 24610430123078657066501

Category Code: 5964  Auth. Code: 881366  Case #: 010089977

Airline Ticket #:  Customer Service #: 1-800-123-4567

---

First Chargeback

Incoming Chargeback Reason: 90 / NON-RECIPET OF MERCHANDISE

Message from Issuing Bank: CH DID NOT RCV MERCHANDISE

Merchant Received Date: 07/03/00  Merchant Due Date: 07/17/00

Second Chargeback

Incoming Chargeback Reason:

Message from Issuing Bank:

Merchant Received Date:  Merchant Due Date:

Worklist   Chargebacks   Retrievals

CB #023207624   RT #317247369   Case #3   Case #4   Case #5

Chargeback Information                🖨 Print           🔒 Release Case

Action Code: EXPIRED          Reason Code: 37 / FRAUDULENT TRANSACTION - NO CH AUTH Name: XYZ Company, Inc.

Cardholder #: 54911300088004500   Merchant #: 6761182000

Due Date: 02/01/01            Request Date: 01/18/01         Processing Date: 11/17/00

Chargeback Amount: 146.90 USD   Transaction Date: 11/15/00    Chargeback Cycle: FIRST Transaction Amount: 146.90 USD   Transaction Locator #: 1115 45678017

Foreign Amount:               Reference #: 78541860321004000305618

Category Code: 5964           Auth. Code: 916773             Case #: 023207624

Case # 000000000   Merchant Actions: [- Select One -]   Image: [_____] Browse
  Letters
    advice          ✏ Add Comments Here ↓                Description: [_____] Add
    bank_doc
                  [                              ]       🗑 Delete    salesdraft_00854698563254
                                                                      advice_00854698563254
                                                         🗑 Clear All

[Submit Case]

🔁 🔍 📋                                                 User Logged:   mespino
                                                         Merchant #:    61523695545

Worklist   Chargebacks   Retrievals
CB #020882320   RT #316460948   Case #3   Case #4   Case #5

Chargeback Information  🖨 Print   🔒 Release Case

Action Code: WORK IN PROGRESS   Reason Code: 37 / FRAUDULENT TRANSACTION - NO CH AUTH

Name: XYZ Company, Inc.

Cardholder #: 5420390038005300   Merchant #: 6761182000

Due Date: 01/10/01   Request Date: 12/27/00   Processing Date: 09/02/00

Chargeback Amount: 39.95 USD   Transaction Date: 08/31/00   Chargeback Cycle: Second

Transaction Amount: 39.95 USD   Transaction Locator #: 0831 45081251

Foreign Amount:   Reference #: 78541860245078657047015

Category Code: 5964   Auth. Code: 863101   Case #: 020882320

Case # 000000000   Merchant Actions: [- Select One -]   Image: [     ] Browse
Letters
  advice   ✏ Add Comments Here ↓   Description: [     ] Add
  bank_doc
                                                          🗑 Delete   salesdraft_00854698563254
                                                                      advice_00854698563254
                                                          🗑 Clear All

[Submit Case]

User Logged:   mespino
                                                  Merchant #:    61523695545

Worklist    Chargebacks    Retrievals

| CB #304561317 | Case #2 | Case #3 | Case #4 | Case #5 |

Chargeback Information    🖨 Print    🔒 Release Case

- Action Code: Work In Progress    Reason Code: 59 / Services Not Rendered
- Name: XYZ Company , Inc.
- Cardholder #: 4224180037370023    Merchant #: 67611820000
- Due Date: 02/09/01    Request Date: 01/21/00    Processing Date: 11/16/00
- Chargeback Amount: 52.16 USD    Transaction Date: 11/15/00    Chargeback Cycle : First
- Transaction Amount: 52.16 USD    Transaction Locator #: 1115 45688796
- Foreign Amount: 98.60 CAN    Reference #: 24600399225003400780135
- Category Code: 6233    Auth. Code: 816455    Case #: 304561317

Case # 000000000    Merchant Actions: [- Select One -]    Image: [        ] Browse
Letters
  advice                Add Comments Here ↓    Description: [        ]
  bank_doc
                                                Delete    salesdraft_00854698563254
                                                          advice_00854698563254
                                                Clear All Submit Case User Logged:    mespino
Merchant #:     61523695545

Worklist  Chargebacks  Retrievals

CB #303591077    Case #2    Case #3    Case #4    Case #5

Chargeback Information                    🖨 Print        🔒 Release Case

Action Code: Work in Progress    Reason Code: 61 / Fraudulent Mail/Phone Order Trans

Name: XYZ Company , Inc.

Cardholder #: 4226351258859601    Merchant #: 67811820000

Due Date: 03/21/01    Request Date: 03/07/01    Processing Date: 11/17/00

Chargeback Amount: 180.85 USD    Transaction Date: 11/15/00    Chargeback Cycle : First

Transaction Amount: 180.85 USD    Transaction Locator #: 1115 45688796

Foreign Amount:    Reference #: 24610430320004000317558

Category Code: 5964    Auth. Code: 973462    Case #: 303591077

Case #000908000    Merchant Actions: [- Select One -]    Image: [_____] Browse

📁 Letters
   📄 advice        ✏ Add Comments Here ↓    Description: [_____] Add
   📄 bank_doc
📁 Images                                         🗑 Delete    salesdraft_00854698563254
   📄 sales_draft                                advice_00854698563254

🗑 Clear All

User Logged:    mespino
                              Merchant #:    61523695545

Worklist    Chargebacks    Retrievals

| CB #020432258 | Case #2 | Case #3 | Case #4 | Case #5 |

Chargeback Information  🖨 Print    🔒 Release Case

Action Code: Work In Progress    Reason Code: 85 / Credit Not Processed

Name: XYZ Company , Inc.

Cardholder #: 4417120067001800    Merchant #: 67611820000

Due Date: 12/14/00    Request Date: 11/30/00    Processing Date: 06/23/01

Chargeback Amount: 26.42 USD    Transaction Date: 06/23/00    Chargeback Cycle: Second

Transaction Amount: 56.90 USD    Transaction Locator #: 0623 45525650

Foreign Amount:    Reference #: 24610430175078656055213

Category Code: 5964    Auth. Code: 817003    Case #: 020432258

Case # 000000000    Merchant Actions: [- Select One -]    Image: [        ] Browse
Letters
 — advice    ✎ Add Comments Here ↓    Description: [        ] Add
 — bank_doc
Images                                                     🗑 Delete    salesdraft_00854698563254
 — sales_draft                                                          advice_00854698563254
                                                           🗑 Clear All

[Submit Case]

🔄 🔍 📋                                    User Logged:  mespino
                                            Merchant #:   61523695545
                                                                      001-007

Fig. 10

* DRAFT ONLY*

First Consumer Bank Services
Debit/Credit Services Department

| | | | |
|---|---|---|---|
| To BIN: 461043 | | From BIN: 422906 | |
| First Data Merchant Services<br>PO Box 6605<br>Hagerstown, MD 21741 | | | |
| Input Date: | 02/07/01 | | |
| CH Number: | 422906000000XXXX | Amount: | 253.82 |
| ACQ Ref No.: | 246104303480040494071604 | Trans Type: | 15 |
| Trans Date: | 121200 | CB Ref No.: | 99075 |
| Auth Code: | 098634 | Usage Code: | 1 |
| CB Reason: | 23 | Doc Ind: | 1 |
| SIC Code: | 3703 | Reimb Attr.: | A |
| Settlement ID: | 0 | ACQ Member ID: | 10029627 |
| Merchant Name: | Residence Inns - Atlanta | City/State: | Duluth, GA |
| Text: | 05 Unauthorized Transaction - Please revise. | | |
| Trans ID: | 000347701057227 | | |

Prepared by: (U42670)_____ Phone Number: (800) 123-4567_____ Date: 02/07/01_____

First Consumer Bank Services
Address: 12345 Any Street
Anytown, DC 12345-6789
Telephone: (800) 123-4567

Fig. 11

* DRAFT ONLY*

Advice Letter
Chargeback Advice

ACS Control Number: 123456789012
Cardholder Account Number: 12345678901223456
Transaction Date: 00/00/01
Transaction Amount: $ 000.00
Chargeback Amount: $ 000.00
Acquirer Reference Number: 12345678901234 45678901 2
Resolution Date: 00/00/01

Dear XYZ Company, Inc - 12345678901234567890:

Your account has been adjusted for the amount of $ 000.00 as your customer has initiated a Second Chargeback for Reason Code 23 - Unauthorized Purchaser.

Our investigation shows:

> This transaction was not imprinted or magnetically stripe read and was not signed by the cardholder.

As your processor, we have taken the following steps to ensure that all fair consideration has been taken in our investigation and the results are in accordance with the Credit Card Association Guidelines.

Investigative Steps

- Credit has not been issued for this transaction.
- We have reviewed the documentation supplied by the issuing bank and it meets the requirements established by the Credit Card Association Guidelines.

Preventive Steps

- Obtain a card imprint/magnetic stripe reading and signature for all transactions.

By following the above preventive step(s) you may avoid additional chargebacks for this reason code.

To defend this chargeback, please provide one of the following:

- A copy of the signed and imprinted/magnetic stripe read folio and register card.
- A copy of the signed and imprinted/magnetic stripe read transaction document.

To ensure timely review for your reversal request you must respond to our center by 00/00/01. Please include the ACS Control Number: 123456789012 on any documentation when not replying with the chargeback response form.

If you do not respond by 00/00/01, you may forfeit your reversal rights as established by the Credit Card Association Guidelines.

Fig. 12

```
SAFEWAY STORE #0705
570 NORTH SHORELINE
MOUNTAIN VIEW CA 94040

CARD # 5424180388025360 EX 01/01
REF:9907041 AUTH:2264 5

PAYMENT AMOUNT                    449.03
```

```
I AGREE TO PAY THE ABOVE AMOUNT
ACCORDING TO THE TERMS OF MY CREDIT
CARD AGREEMENT
```

Worklist

Chargebacks    Retrievals

| Due Date | Cardholder Number | | Amount | | Due Date | Cardholder Number | | Amount |
|---|---|---|---|---|---|---|---|---|
| 09/13/01 | 4266859999922388 | 67036800001 | 417.32 | | 09/05/01 | 5491130088004500 | 87611820077 | 1000.00 |
| 08/27/01 | 5432350002507700 | 67472160894 | 6.00 | | | | | |

OUTSTANDING      Previous ◀ ▶ Next    WORKED      Previous ◀ ▶ Next

| | | | |
|---|---|---|---|
| 12/14/00 | anyuser | CB020432258 | |
| 08/27/01 | anyuser | RT304662891 | |

MY MESSAGES     Previous ◀ ▶ Next    MESSAGE VIEWER

User Logged: mespino
Merchant #: 61523695545

Worklist  Chargebacks  Retrievals

CB #010089977   RT #317920718   Case #3   Case #4   Case #5

Retrieval Information    🖨 Print    🔒 Release Case

Request Status: 0 / MERCHANT REQUEST          Reason Code: 30 / SERVICES NOT RENDERED
Action Code: WORK IN PROGRESS                 Merchant #: 67036800001
Merchant Name: XYZ COMPANY, INC., 1-888-555-1212, WITCHITAW, WI
Cardholder #: 4266859999922388                Transaction Locator: 0001494707060
Transaction Amount: 417.32 USD                Reference #: 24610431189072005016168
Foreign Amount:                               Case #: 317920718
Merchant Due Date: 09/13/01                   Customer Service #: 1-800-123-4567
Merchant Request Date: 08/24/01               Airline Ticket #:

Case # 000000000    Merchant Actions:            Image: [      ] Browse
  Letters           [- Select One -]                            Add
    advice
    bank_doc        ✏ Add Comments Here ↓        Description: [      ]

[                    ]       🗑 Delete    salesdraft_00854698563254
                                                              advice_00854698563254
                    [ Submit Case ]              🗑 Clear All 🔄 🔍 📋                                         User Logged: mespino
                                                 Merchant #: 61523695545

Retrieval Information

Request Status: 0 / MERCHANT REQUEST     Reason Code: 30 / SERVICES NOT RENDERED Action Code: WORK IN PROGRESS     Merchant #: 67036800001

Merchant Name: XYZ COMPANY, INC., 1-888-555-1212, WITCHITAW, WI

Cardholder #: 4266859999922388     Transaction Locator: 0001494707060

Transaction Amount: 417.32 USD     Reference #: 24610431189072005018168

Foreign Amount:     Case #: 317920718

Merchant Due Date: 09/13/01     Customer Service #: 1-800-123-4567

Merchant Request Date: 08/24/01     Airline Ticket #:

Transaction Date: 07/06/00     Retrieval Type: REQUEST ONLY

Fig. 16

Worklist    Chargebacks    Retrievals

CB #020882320    RT #316460948    Case #3    Case #4    Case #5

Retrieval Information                                 🖨 Print          🔒 Release Case Request Status : 4 / Illegible or Missing Media           Reason Code: 42 / Late Presentment Action Code: Work in Progress                             Merchant #: 67472160894

Merchant Name: XYZ Company, Inc.

Cardholder #: 5432350002607700                            Transaction Locator: 00000166

Transaction Amount: 6.00 USD                              Reference #: 78421061158004018070269

Foreign Amount:                                           Case #: 316460948

Merchant Due Date: 08/27/01                               Customer Service #: 1-800-123-4567

Merchant Request Date: 08/07/01                           Airline Ticket #:

Case # 000000000     Merchant Actions:                    Image: [            ] Browse
Letters              [- Select One -]                     Description: [        ] Add
  advice
  bank_doc           ❓ Add Comments Here  ↓               🗑 Delete    salesdraft_00854698563254
                                                                       advice_00854698563254
                     [                              ]
                                                          🗑 Clear All
                     [Submit Case]

User Logged:   mespino
                                                          Merchant #:    61523695545

Worklist    Chargebacks    Retrievals

CB #023207624    RT #317247369    Case #3    Case #4    Case #5

Retrieval Information     🖨 Print    🔒 Release Case

Request Status: 0 / Merchant Request    Reason Code: 28 / T & E - Account Number Verification Action Code: Work in Progress    Merchant #: 67611820077

Merchant Name: XYZ Company, Inc.

Cardholder #: 5491130088004500    Transaction Locator: 0801 000149489

Transaction Amount: 1000.00 USD    Reference #: 24435141214072009181577

Foreign Amount:    Case #: 317247369

Merchant Due Date: 09/05/01    Customer Service #: 1-800-123-4567

Merchant Request Date: 08/16/01    Airline Ticket #:

Case # 000000000
- Letters
  - advice
  - bank_doc
- Images
  - sales_draft

Merchant Actions:
- Select One -

Add Comments Here ↓

Image: [ ] Browse
Description: [ ] Add

Delete
   salesdraft_00854698563254
   advice_00854698563254

Clear All

User Logged: mespino
Merchant #: 61523695545

IDS Investigator Login

User Name:

Password:

Forgot My Password     Change Password

Login | Clear

Fig. 20

My Queues    Main Case    New Case

Queue Selector

New Work    Pending

| ID | Name | | Due Date |
|---|---|---|---|
| 00123 | Walmart | 1253 | 10/11/01 |
| 00124 | VISA Red Int. | 715 | 10/26/01 |
| 00125 | Lloyds Int. | 569 | 10/16/01 |
| 00126 | Walmart PN | 1866 | 10/19/01 |
| 00127 | M/C Int. | 1023 | 10/30/01 |
| 00128 | M/C USA | 283 | 11/16/01 |
| 00132 | Lloyds Int. ARB | 159 | 10/16/01 |

Previous ◀ ▶ Next

Work Tracker

| | Last Action | Dispute Amount |
|---|---|---|
| 123456789012 | To Merchant | 99,999.99 |
| 123456789012 | To Bank | 99,999.99 |
| 123456789012 | Fwd to Pre-Arb | 99,999.99 |
| 123456789012 | To Merchant | 99,999.99 |
| 123456789012 | To Bank | 99,999.99 |
| 123456789012 | To Merchant | 99,999.99 |
| 123456789012 | Fwd to Collections | 99,999.99 |

Previous ◀ ▶ Next

My Worklist

| | Due Date | Case | Reference | | Dispute Amount | Last Action | Work Code | Usage Code |
|---|---|---|---|---|---|---|---|---|
| | 10/11/01 | 123456789012 | 123456789012345678901234567890 | | 9,999,999.99 USD | To Merchant | 01 | 1 |
| | 10/26/01 | 123456789012 | 123456789012345678901234567890 | | 9,999,999.99 USD | To Merchant | 02 | 2 |
| | 10/16/01 | 123456789012 | 123456789012345678901234567890 | | 9,999,999.99 USD | To Merchant | 03 | 2 |
| | 10/19/01 | 123456789012 | 123456789012345678901234567890 | | 9,999,999.99 USD | Forward to Pre-Arb | 04 | 1 |
| | 10/30/01 | 123456789012 | 123456789012345678901234567890 | | 9,999,999.99 USD | Forward to Inc Como | 05 | 1 |

Previous ◀ ▶ Next

User ID: mespino
Screen ID: 001-001

Fig. 21

My Queues   Main Case   New Case
CN123456789

🗐 Case Files          Case Information          ✏ Update   🖨 Print Info   🔒 Release Case
⊞🗀 First CB
⊞🗀 Second CB         Reason Code:                      IDS Control #:
⊞🗀 Reversal          31 / Transaction Amount Differs   123456789
                      Member Message Text:
                      50 Character Member Message Would Appear Here.

Merchant Name:
                      XYZ Company, Inc.

Platform: South                   Usage Code: 01/VISA
                      Cardholder #:                     Merchant #:
                      12345678901234567890              12345678901234567890123
                      Dispute Amount:                   Reference #:

Associated CB  Auth Records  Trans/Credit  Actions   CB History   RT History   User Notes   Exceptions

| Control # | User ID | Reference # | Dispute Amount | Actions | Action Date | Work Type | Usage Code |
|---|---|---|---|---|---|---|---|
| 123456789012 | useridhere | 12345678901234567890123 | - 9,999,999.99 USD | Fwd to Collections | 01/01/01 | 08 | 2 |
| 123456789012 | useridhere | 12345678901234567890123 | 9,999,999.99 USD<br>9,999,999.99 CAN | Fwd to Pre-Arb | | 02 | 2 |
| 123456789012 | useridhere | 12345678901234567890123 | 9,999,999.99 USD<br>9,999,999.99 RUS | To Bank | 01/01/01 | 02 | 2 |
| 123456789012 | useridhere | 12345678901234567890123 | - 9,999,999.99 USD<br>- 9,999,999.99 GER | To Merchant | 01/01/01 | 01 | 1 |
| 123456789012 | useridhere | 12345678901234567890123 | - 9,999,999.99 USD | To Merchant | | 01 | |

  

User ID: mespino
Screen ID: 001-001

Fig. 22

My Queues    Main Case    New Case

CN123456789

🗁 Case Files
├─ First CB
├─ Second CB
└─ Reversal

Case Information    ✏ Update    🖨 Print Info    🔒 Release Case

Reason Code:
31 / Transaction Amount Differs

IDS Control #:
123456789

Member Message Text:
50 Character Member Message Would Appear Here.

Merchant Name:
XYZ Company, Inc.

Platform: South

Usage Code: 01/VISA

Cardholder #:
12345678901234567890

Merchant #:
12345678901234567890123

Dispute Amount:

Reference #:

Associated CB   Auth Records   Trans/Credit   Actions   CB History   RT History   User Notes   Exceptions

Investigator Actions: [- Please Select -]    Sub-actions:

```
RESPONSE
FORWARD
REQUEST INFO
PENDING
```

User ID: mespino
Screen ID: 001-001

Fig. 25

Investigator Actions: Response  
Select Canned Msg:

| Canned Msg Title |
| Canned Msg Title |
| Canned Msg Title |
| Canned Msg Title |
| Canned Msg Title |

Your case has been re  
☑ Add Canned Only  
🗎 Freehand Edit Advice

○ Submit Only  
○ Submit and Load Next

Sub-actions: (- Please Select One -) $ Edit GL's  
Image Selector:

| advice_100101 |
| salesdraft_100101 |
| request_100101 |
| output_100101 |
| bankdoc_100101 |
| advice_1015001 |
| rebuttal_101501 |

| advice_101501 |
| rebuttal_101501 |
| salesdraft_100101 |
| output_100101 |

BANK MERCHANT WASH CREDIT W/ DEBIT SPLIT RES TO MERCHANT SPLIT RES TO OTHER OVERRIDE

Fig. 26

Investigator Actions: Response

Select Canned Msg:

| Canned Msg Title |
| Canned Msg Title |
| Canned Msg Title |
| Canned Msg Title |
| Canned Msg Title |

Your case has been re

☑ Add Canned Only
📄 Freehand Edit Advice

○ Submit Only
○ Submit and Load Next

Submit Case

Sub-actions: Merchant     $ Edit GL's

Image Selector:

| advice_100101 |
| salesdraft_100101 |
| request_100101 |
| output_100101 |
| bankdoc_100101 |
| advice_1015001 |
| rebuttal_101501 |

| advice_101501 |
| rebuttal_101501 |
| salesdraft_100101 |
| output_100101 |

Fig. 27

METHOD AND APPARATUS FOR PROCESSING ELECTRONIC DISPUTE DATA

CROSS-REFERENCES TO RELATED APPLICATIONS

This application claims the benefit of U.S. provisional patent application No. 60/353,805 filed on Jan. 30, 2002 entitled "Integrated Dispute System" which is hereby incorporated by reference in its entirety for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

This invention relates generally to a system for communicating and resolving payment transaction disputes between various parties involved in a transaction, e.g., a dispute over a credit card transaction.

BACKGROUND

Traditionally, payment transaction disputes have been resolved through a series of exchanges of information between the various parties involved in a transaction. When a dispute arose in the past, the investigator of the dispute would send information about the dispute to the merchant via the postal system. The investigator would have to print out the information for mailing to the merchant. This resulted in the handling of the dispute manually—which inevitably led to extended time periods for resolving the dispute and the merchant being debited for a longer period of time. Thus, there was an extended cycle time and a greater possibility that a dispute would not be resolved properly based on the extended time periods that arise under the manual handling of disputes.

In the credit dispute process, the customer typically has 45 days to dispute a charge. Then, the merchant has 45 days to respond to the disputed charge, i.e., the "chargeback." If the merchant disputes the chargeback, the customer again has 45 days to dispute the merchant's response. Thus, time is valuable in disputing these charges to both the merchant and the customer. A delay in processing due to loss of information or misrouting of information can easily lead to missing a dispute resolution deadline.

SUMMARY

The various embodiments of the invention described herein facilitate the processing of disputed payment transactions. Various embodiments of the invention are described and will be appreciated by those of ordinary skill in the art.

For example, one embodiment of the invention provides information related to a disputed payment transaction by receiving a disputed payment transaction; storing data relating to the disputed payment transaction in a memory; establishing a case identifier for the disputed payment transaction; associating the case identifier with a queue of cases to be worked; and generating a queue of cases to be worked, wherein the queue of cases includes the case identifier.

In another embodiment of the invention, a method of processing a payment transaction dispute is utilized by receiving a payment transaction dispute; obtaining a set of data relating to the payment transaction dispute; providing the set of data as an input to computerized rules engine; processing the set of data with the rules engine; designating the payment transaction dispute to a queue based upon the result of the act of processing the set of data with the rules engine.

Other embodiments of the invention will be apparent from the disclosure given below taken in conjunction with the figures.

BRIEF DESCRIPTION OF THE DRAWINGS

FIG. 3 illustrates an example of a user interface showing a work list for an investigator.

FIG. 4 illustrates an example of a user interface for selecting merchant actions.

FIG. 5 illustrates an example of a user interface showing charge back information.

FIG. 6 illustrates an example of a user interface showing an expired entry from the outstanding portion of a work list.

FIG. 7 illustrates an example of a user interface showing an outstanding portion of a work list.

FIG. 8 illustrates an example of a user interface showing the outstanding portion of a work list.

FIG. 9 illustrates an example of a user interface showing a work portion of a work list.

FIG. 10 illustrates another example of a user interface showing a work portion of a work list.

FIG. 11 illustrates an example of the document identified as "bank_doc in FIG. 4.

FIG. 12 illustrates an example of a document identified as "advice" in FIG. 4.

FIG. 14 illustrates an example of a user interface that allows a merchant to view retrieval information.

FIG. 15 illustrates a sample retrieval record for a user interface.

FIG. 16 illustrates the entire record from FIG. 15 which is obtainable with the scroll bar of the user interface.

FIG. 17 illustrates an additional example of a retrieval record.

FIG. 18 illustrates an additional example of a retrieval record.

FIG. 20 illustrates an example of a user interface provided for investigator login.

FIG. 21 illustrates an example of a queue of cases, for example, for use by an investigator.

FIG. 22 illustrates a sample record selected from the queue selector section in FIG. 21.

FIG. 25 illustrates an example of a user interface for selecting investigator actions.

FIG. 26 illustrates an example of a user interface for selecting a sub-action for the response action.

FIG. 27 illustrates yet another example of a user interface for selecting sub-actions for the response action.

DESCRIPTION

Figure 19:
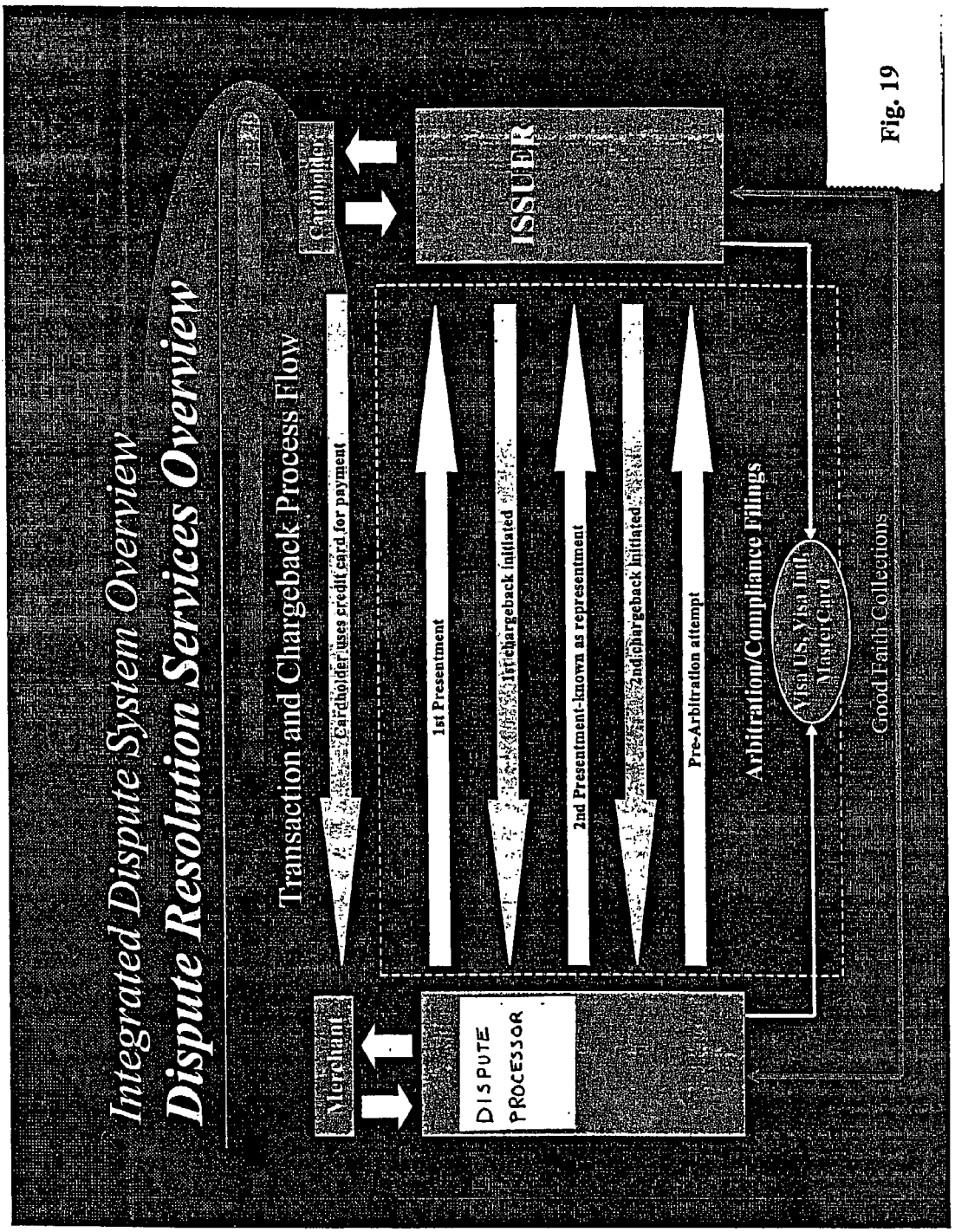
FIG. 19 illustrates an overview of an exemplary credit dispute.

An overview of a payment dispute, such as a credit dispute, is shown in FIG. 19 to set the stage for discussion of the various embodiments of the invention. While the various embodiments can be applied to a variety of payment transactions, credit transactions will primarily be used as examples in this description. As an example of a disputed credit card transaction, a cardholder and merchant first conduct a transaction. The cardholder has a bank that issues his/her account/card (the issuer) while the merchant similarly has a bank that is responsible for its account (the acquirer). The merchant submits a charge, for example, to the acquiring bank or the acquiring bank's processing center (e.g., First Data Merchant Services). This is then routed to Visa, Mastercard, etc. which routes it to the issuer's bank for approval. The issuing bank approves the payment and notifies the cardholder via the cardholder's statement. If there is a problem, the cardholder disputes the charge to the issuing bank or requests further information about the charge. The issuing bank disputes the charge through Visa or Mastercard to the acquiring bank or the acquiring bank's processing center (again, e.g., First Data). These disputed charges are then stored in a database of the processing center as a chargeback.

In the "back office" at the processing center of the acquiring bank, investigators work the dispute to resolve whether the transaction was improper. In some instances, the cardholder may have only requested proof of purchase in the form of a sales receipt if the cardholder does not remember making the purchase (as opposed to actually disputing the charge). If the investigator believes there is reason to believe that the transaction is entitled to be disputed by the cardholder, the investigator debits the merchant for the value of the transaction. This is referred to as a "chargeback". To rebut the chargeback, the merchant needs to submit further information for use by the investigator. FIG. 19 illustrates further activities according to the standard chargeback process.

According to one embodiment, an imaging infrastructure, allows the documents of the transaction to be stored digitally on an image repository, rather than as paper documents in physical folders. Thus, they are easily available to an investigator or the merchant electronically. This saves on transaction fees as well as time. It creates a more unified system for everyone involved. Similarly, when any of the parties views the file, it can see the same documents. As an additional feature, it can be used to backup data in case of fire.

Figure 1:
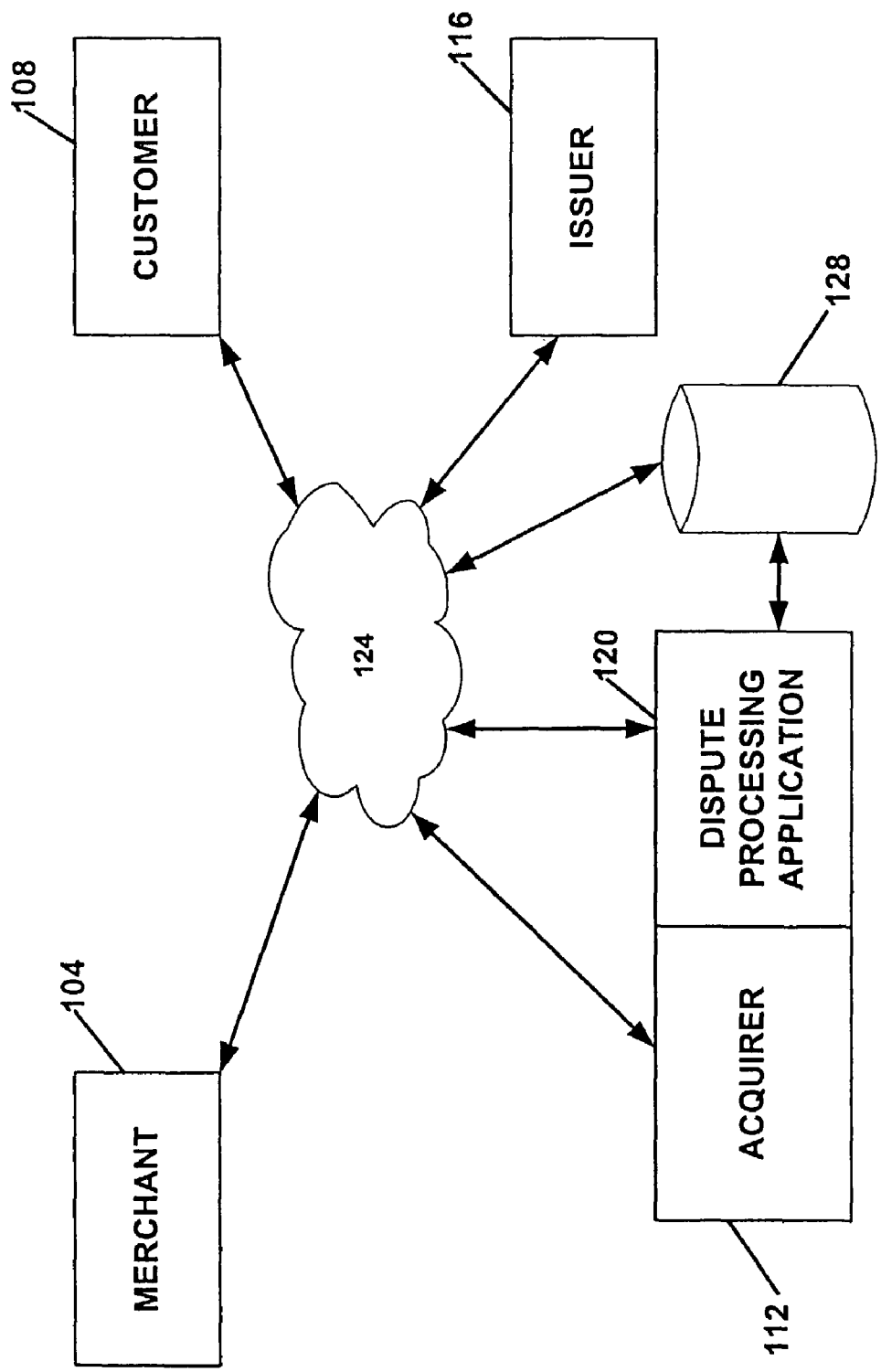
FIG. 1 illustrates a network that allows communication between various parties for resolving a disputed transaction according to one embodiment.

FIG. 1 illustrates one embodiment of the invention. In system 100 of FIG. 1, a merchant 104, acquiring bank 112, issuing bank 116, and customer 108 can communicate across network 124, such as the Internet. Furthermore, a dispute processing application 120, such as an acquiring bank processing center for resolving credit card disputes can communicate across network 124 with each of the parties. The network 124 also can be used to complete an original transaction between the merchant and customer.

The merchant can utilize a software package that allows the merchant to be coupled to the database 128. In fact the merchant could even establish such a connection or retrieval of data by coupling to the acquiring bank website which then provides the connection to the data either via the open network 124 or via a more secure connection, such as a dedicated connection to the database.

Similarly, an investigator who is responsible for resolving a disputed charge can use a software package that permits the investigator to communicate with the database 128 and log requests for information for various merchants or other parties.

In addition, an issuing bank 116 or customer 108 may communicate with the database 128 so as to request or provide data related to a disputed charge. Again, the customer could access the data via the issuing bank's website as explained above in regard to the merchant/acquiring bank. This would also facilitate the ability of the cardholder or issuer to check on the status of a disputed charge.

Figure 2:
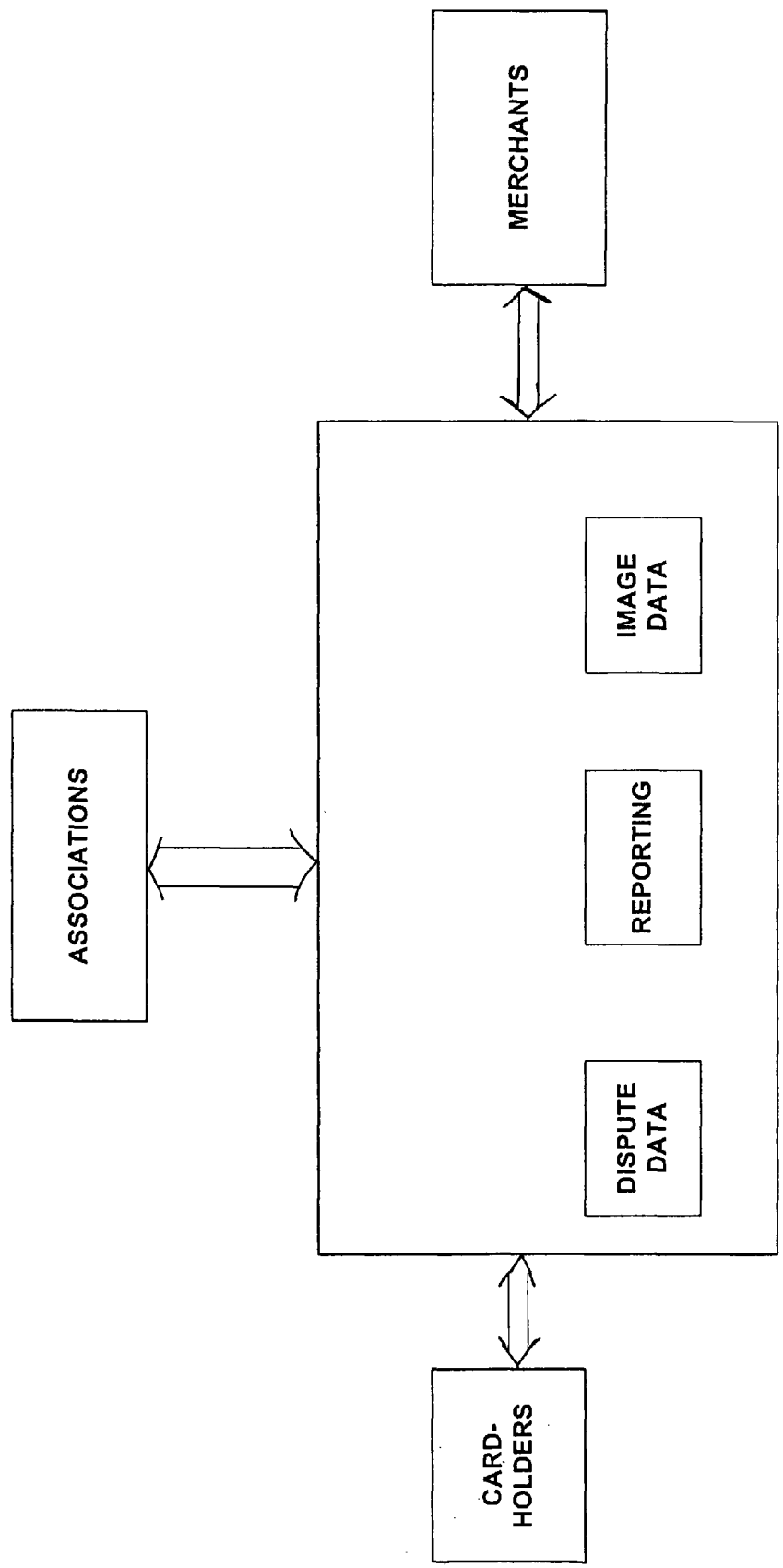
FIG. 2 illustrates a system that provides a system for interaction between merchants and cardholders in the dispute resolution process.

FIG. 2 illustrates another embodiment of the invention which demonstrates the interaction available by both merchants and cardholders in the dispute resolution process. FIG. 2 shows that dispute data, a reporting facility, and image data can be accessed by both cardholders, merchants, and dispute resolution investigators. Furthermore, this information can be networked with other components of the processing system. For example, in the case of a company like First Data, USA, its FDR, FDMS, North and South Legacy Systems, and its FDNet are shown networked.

Electronic Integrated Dispute System (EIDS)

According to one embodiment of the invention a system is provided that allows a merchant to communicate with a central database application program that can access records from the credit dispute process. The merchant computer can establish a connection via an internet browser to the application. For example, the merchant can couple with the server of the processing center and launch the application program via the processing center's website. Alternatively, the merchant can be coupled to the application program via an acquiring bank's (or third party's) website.

An example of the merchant's interaction with the application program can be seen through the following examples shown in the figures. FIG. 3 shows an example of the worklist for a particular merchant once they have entered into the application program. The worklist is divided into outstanding cases (e.g., cases that the merchant needs to work) and cases worked (e.g., cases that the merchant has already worked on that day). The first two cases shown in FIG. 3 of the Outstanding list are actually expired because too much time has elapsed since they were issued. Thus, they are displayed in red lettering to indicate the expiration.

The binoculars icon in FIG. 3 allows a merchant to search for a case they worked in previous days. The "My Messages" block shows either a confirmation indicated by a check mark or an explanation mark that indicates that the investigator needs additional information.

By clicking on the pencil icon to the left of a case record, a merchant can bring up the details of the case record. Thus, FIG. 4 shows the chargeback information for the corresponding case shown in FIG. 3. FIG. 5 shows the additional chargeback information that can be obtained by the scrollbar to the right of the window. For example, the chargeback information in FIG. 4 illustrates that the charge is being disputed by the customer because the customer did not receive the merchandise. This particular example is indicated as a first chargeback. However, if the first chargeback is not resolved satisfactorily, the chargeback can be resubmitted by the issuing bank/customer as a second chargeback. In such a case, the information from the first chargeback still appears so that a complete record of the chargeback history can be displayed.

The "Print" icon allows one to print the record while the "Release Case" icon allows one to close the record and return to the worklist page.

As shown in the bottom left hand portion of FIG. 4, a file icon indicates the documents that are available for viewing by the user. These documents can include advice letters as well as any document that has been scanned or imaged and associated with the record. For purposes of this patent, the term "imaged electronic document" shall be deemed to include any data or file produced by scanning or imaging a physical document so that the data or file can be conveyed as an electronic file across a computer network. For example, scanning a sales receipt and saving the file in TIFF format shall be considered creating an imaged electronic document.

Figure 13:
FIG. 13 illustrates an example of a scanned sales receipt.

A tree structure can be implemented to provide the images for viewing by the user that are associated with the particular chargeback record. For example, the customer's copy of the sales receipt can be imaged and stored in the database for viewing by the merchant without needing to mail or fax a copy of the document to the merchant. Each time the merchant opens the case, the relevant documents relating to the case can be accessed and viewed by the merchant. Such documents might include receipt, proof of shipping receipt, cardholder letter stating that the merchandise was not received, etc. Similarly, the same documents can be viewed by the investigator using the same record information at his/her location. FIGS. 11 and 12 illustrate the documents identified as "advice" and "bank_doc" in FIG. 4. FIG. 13 illustrates an example of a scanned sales receipt that can be stored and accessed by the parties working the dispute.

In FIG. 4, the merchant can either "Accept Chargeback" or "Dispute Chargeback" by selecting one of those choices in the selection block labeled "Merchant Actions." If the merchant checks its records and realizes that the customer is correct in disputing the charge, the merchant can select "Accept Chargeback" and click on the "Submit Case" icon. However, if the merchant wants to dispute the chargeback, the merchant can select "Dispute Chargeback" and attach evidence of why the chargeback is disputed. Namely, the merchant can scan/image a document and save it to the merchant's hard drive, for example. Then, the merchant can use the "Browse" button to access the file for the document on the merchant's hard drive and enter a description about the document for the investigator. Furthermore, the merchant can enter a text message in the "Add Comments Here" block to explain to the investigator the merchant's reasons for disputing the chargeback or to provide other relevant information. When done, the merchant can use the "Submit case" button to submit the response to the chargeback.

FIGS. 6-10 show the other example records from the worklist for the merchant. As can be seen at the top of each opened record, a merchant can have open at least five records at the same time. Obviously, the software could be configured to allow more or less records to be worked by the merchant.

Similarly, FIGS. 14-18 show examples of the user interface that allows a merchant to view retrieval information. A retrieval is implemented when a customer merely requests proof of charge rather than disputing that a charge was made. For example, if the customer does not recall making a charge, then the customer asks for proof of charge in the form of a receipt, etc. By clicking on the "Retrieval" icon on the Worklist page, the merchant can see the retrievals that are outstanding and the retrievals that have been worked. Furthermore, the "My Messages" block in the bottom portion of FIG. 14 shows the information that has been received by the investigator and noted as received (check mark) or requiring additional information (exclamation point). FIG. 15 illustrates a sample retrieval record. Again, the scroll bar to the right of the retrieval information section allows the user to scroll down to see an entire record, as shown in FIG. 16. FIGS. 17 and 18 illustrate additional retrieval record examples.

Figure 28:
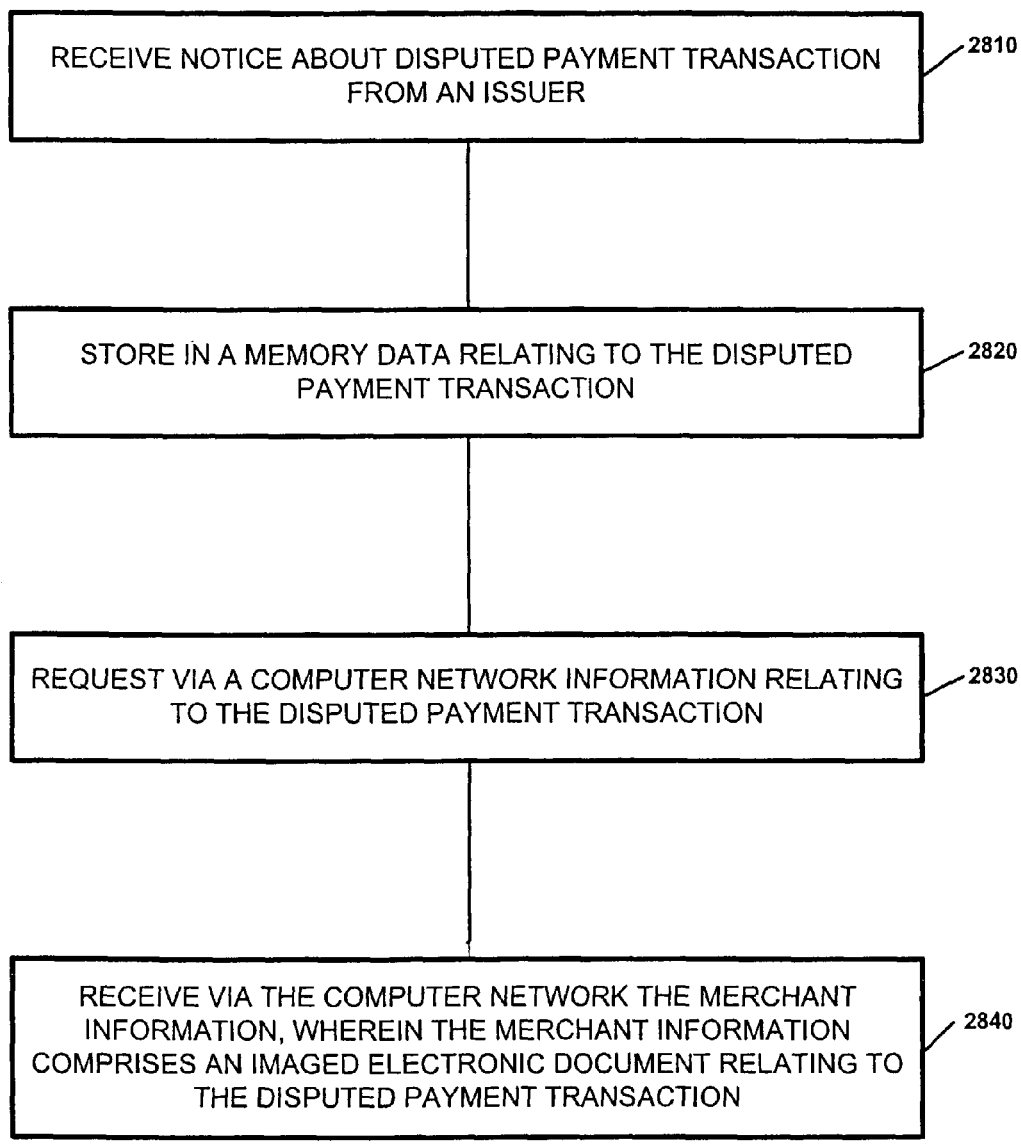
FIG. 28 illustrates a flow chart for implementing a method for a dispute resolution process according to one embodiment of the invention.

FIG. 28 illustrates a method for implementing one embodiment of the invention. According to flowchart 2800 of FIG. 28, a notice is received about a disputed credit charge from an issuer in block 2810. The data relating to the disputed credit charge is stored in memory as illustrated in block 2820. Block 2830 shows that information relating to the disputed credit charge can be requested via a computer network. For example, information from the merchant can be requested for resolving the dispute. Block 2840 illustrates that the merchant information can be received via the computer network, wherein the merchant information comprises an imaged electronic document relating to the disputed credit charge.

Figure 29:
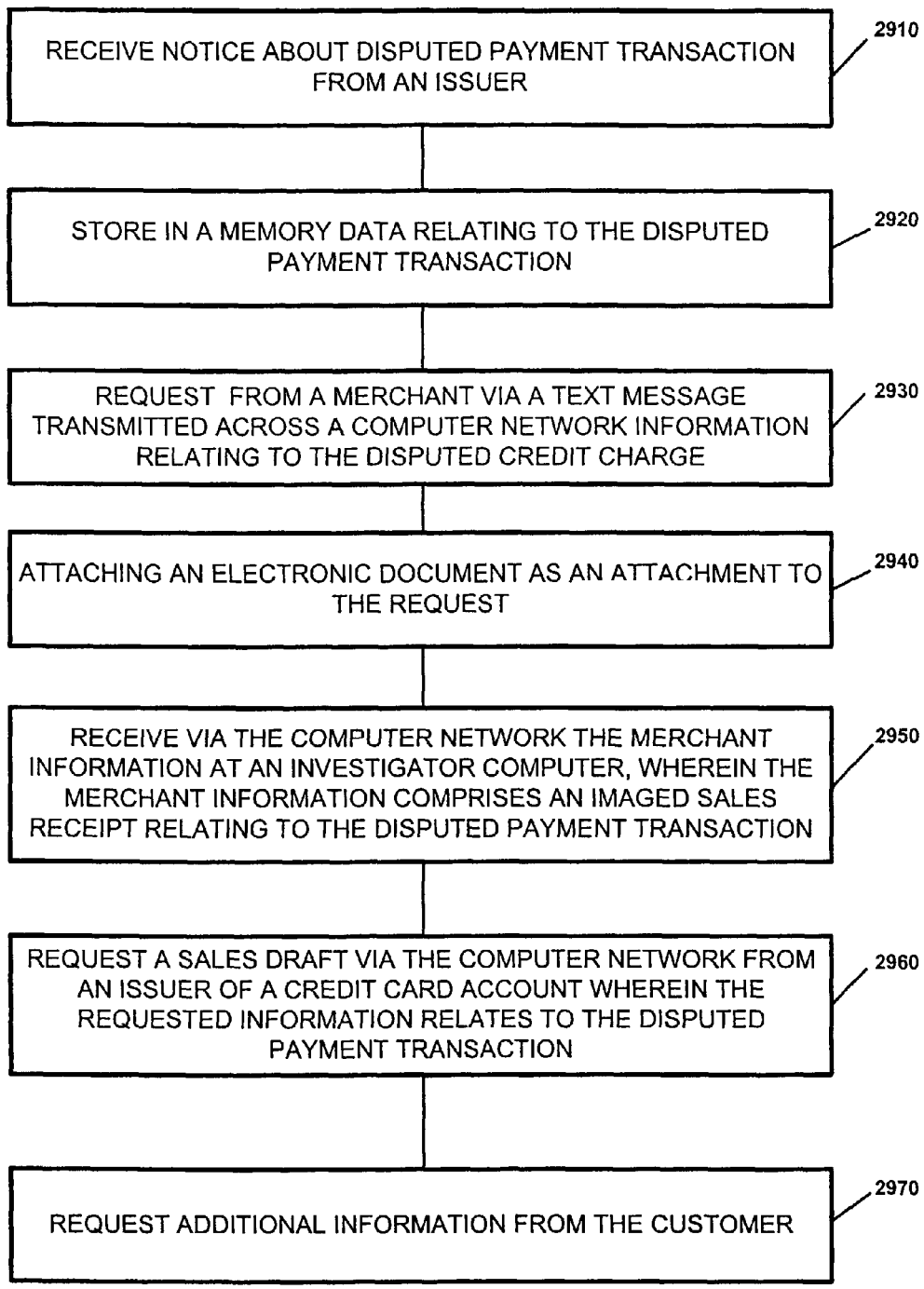
FIG. 29 illustrates a flow chart for implementing a method for a dispute resolution process according to another embodiment of the invention.

FIG. 29 illustrates yet another example of the invention. In flowchart 2900 of FIG. 29, notice is received from a card issuer about a disputed credit charge, as shown in block 2910. The data relating to the disputed credit charge is stored in memory as shown in block 2920. Block 2930 illustrates that request is made from a merchant via a text message transmitted across a computer network for information relating to the disputed credit charge. Furthermore, block 2940 illustrates that accompanying data such as a electronic document can be attached to the request. This attachment can be used to help the merchant better understand the disputed charge. Block 2950 illustrates that the merchant information is received via the computer network at an investigator's computer. This merchant information can be comprised of an imaged sales receipt relating to the disputed credit charge. Thus, for example, if the cardholder disputes a charge, the merchant can attach an electronic image of the receipt which the cardholder signed at the time of purchase and return that as the merchant information for rebutting a chargeback. Block 2960 shows that a request can be made for a sales draft via the computer network. This sales draft can be requested from the issuer of the credit card account and the information requested would relate to the disputed credit charge. Similarly, block 2970 illustrates that additional information can be requested from the customer.

Figure 30:
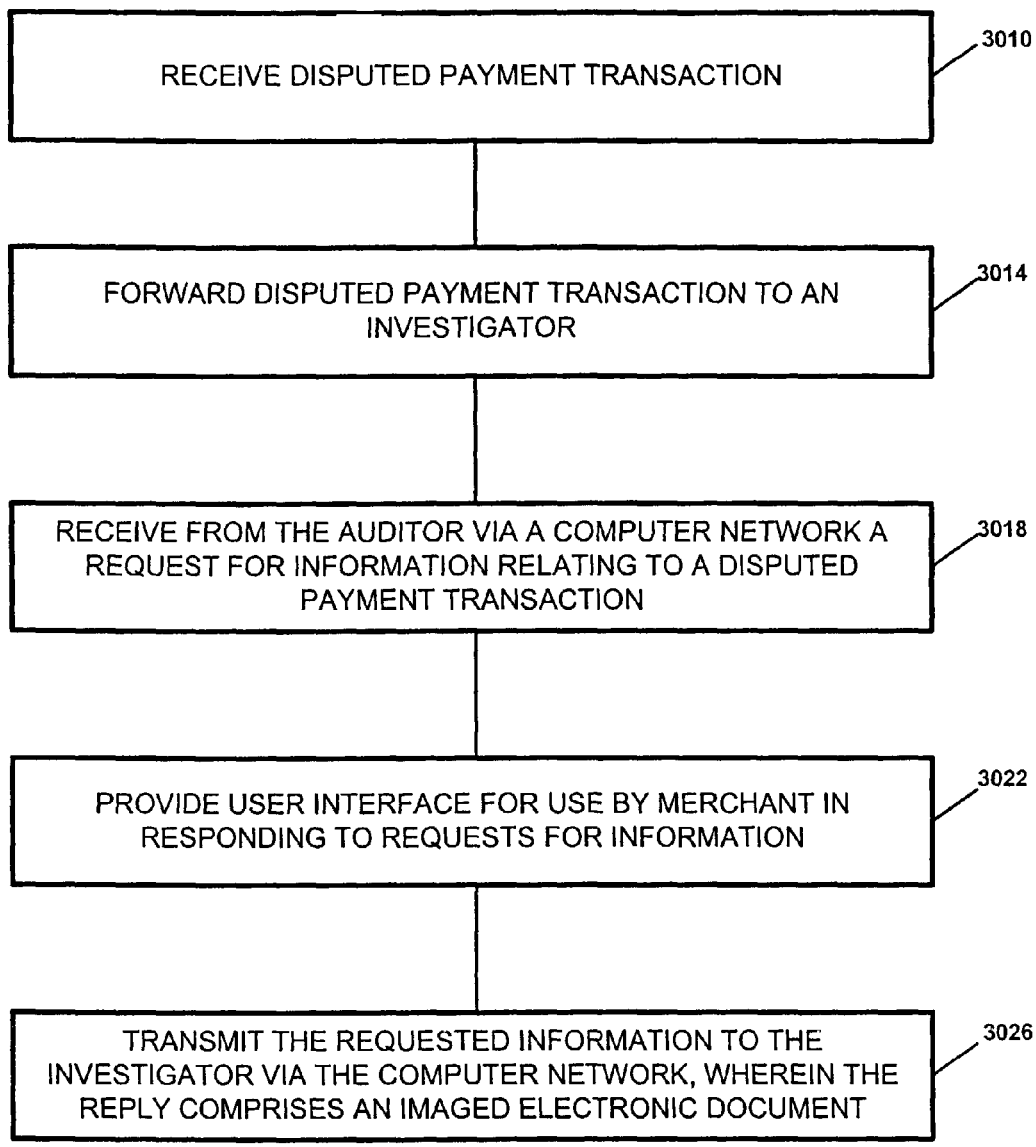
FIG. 30 illustrates a flow chart demonstrating a method for implementing a dispute resolution process according to yet another embodiment of the invention.

FIG. 30 illustrates yet another embodiment of the invention. In flowchart 3000 of FIG. 30, a disputed credit charge is received as shown in block 3010. This disputed credit charge is forwarded to an investigator (also known as an auditor), as illustrated in block 3014. The investigator can request further information from the various parties involved in the transaction system. Thus, as shown in block 3018, a request from the investigator can be received by one of the parties via a computer network requesting information relating to a disputed credit charge. In block 3022, a user interface is provided. In the case of a merchant, the user interface can be used by the merchant to respond to the request for information received from the investigator. Thus, as shown in block 3026, the merchant can transmit the requested information to the investigator via the computer network. Furthermore, as part of this reply the merchant can include an imaged electronic document, such as a signed sales receipt or other material.
IDS An embodiment of the invention that is used more from the perspective of the investigator of a dispute will now be discussed. An investigator of disputes can access his/her browser to establish connection with the dispute processing application program. For example, if an investigator is assigned to a particular acquiring bank, the investigator's log-on profile may present data relating to that investigator's access rights. The investigator can access the application program via the processing center's (e.g., First Data's) website. FIG. 20 illustrates that access can be provided through a secured screen where the user must enter an ID and password.

FIG. 21 illustrates the queue of cases for an investigator. The screen shown in FIG. 21 illustrates a "Queue Selector" section that illustrates either new work or case records that have been pended until the investigator can gather further information. Similarly, a "Work Tracker" section shows cases that have already been worked by an investigator and the last action for the case record. Similarly, the dispute amount is shown. Finally, a "My Worklist" section shows the entire worklist for a particular investigator. It is envisioned that the "My Worklist" section will only be accessible by supervisor personnel so as to prevent any individual investigator from selectively choosing cases to work and avoiding others. This will allow for a more efficient or regulated execution of the workload by the individual investigators while still permitting supervisors to evaluate the workload when appropriate. While the "Queue Selector" section of FIG. 21 illustrates different case records from different companies being assigned to the same investigator, it is envisioned that each investigator might work case records from a single company. For example, one investigator might work cases from only a single bank.

Figure 23:
FIG. 23 illustrates an example of case information which can be displayed for viewing by a user interface.
Figure 24:
FIG. 24 illustrates a scanned version of a sales draft.

FIG. 22 illustrates a sample record selected from the Queue Selector section in FIG. 21. In FIG. 22, the case information is displayed for viewing. In addition, a "Case Files" section allows the investigator to pull up the documents that have been scanned in or associated with a particular record. As shown in FIG. 23, the first chargeback record includes scanned versions of two sales drafts. For example, FIG. 24 shows one of these documents. The scanned document can be placed in the database in a variety of ways. For example, it can be received from the merchant, customer, or customer's bank. Alternatively, the merchant could mail the document through the postal service to the investigator. Then, the investigator can scan in the document.

For a particular case record, an investigator can take various actions. As shown in FIG. 22, the user can click on the "Actions" tab. By clicking on the "Actions" tab, the display shown in FIG. 25 can be brought up. FIG. 25 illustrates that an investigator can invoke different actions on a record. For example, by clicking on the "Investigator Actions" icon, the investigator can select from the following options: "Response"; "Forward"; "Request Info"; or "Pend" the case. FIG. 26 shows an example of a display that can be invoked if "Response" is selected as the investigator action. By responding, they can forward the case to the merchant. By forwarding, they can forward the case to a different work queue, e.g., a different investigator. The investigator can request additional information about the record from the issuing bank or customer through the use of the "Request Info" action. Finally, the investigator can pend the case so as to allow the record to be worked on at a later date.

FIG. 26 illustrates an example if the investigator selects the "Response" investigator action. In such an instance, the investigator can choose from a menu of sub-actions. For example, the pull down menu in FIG. 26 illustrates that the investigator can choose from the options: "BANK"; "MERCHANT"; "WASH CREDIT W/DEBIT"; "SPLIT RES TO MERCHANT"; "SPLIT RES TO OTHER"; AND "OVERRIDE."

If the "MERCHANT" is selected as the sub-action, the investigator can then proceed to the "Select Canned Msg" section of the display. This portion of the program displays pre-selected messages that are often used for communicating with the merchant. For example, one message might be: "Please supply copy of signed sales draft." By clicking on the double arrow box to the right of the canned message main box, the selected message is stored. This message will then be stored in the database and presented to the merchant when the merchant connects to the database through the merchant interface. A rules engine can be used by the processing center to determine which code should be assigned to the record.

To the right of the display, the "Image Selector" portion allows the investigator to select images from the database. For merchants which still communicate with an acquirer via the postal service, the selected images can be automatically printed out for mailing with the investigator's letter to the merchant. The investigator merely highlights an image file name and uses the double arrows to move it to the right hand box to designate the images to send to the merchant.

Finally, when the investigator completes the message information for the record, the icon labeled "Submit Case" can be selected to submit the case for release to the merchant.

In many instances, the investigator will try to work the record to avoid debiting the merchant if at all possible. If the investigator cannot resolve the dispute in that fashion, then the merchant can be debited and further information requested.

Figure 31A:
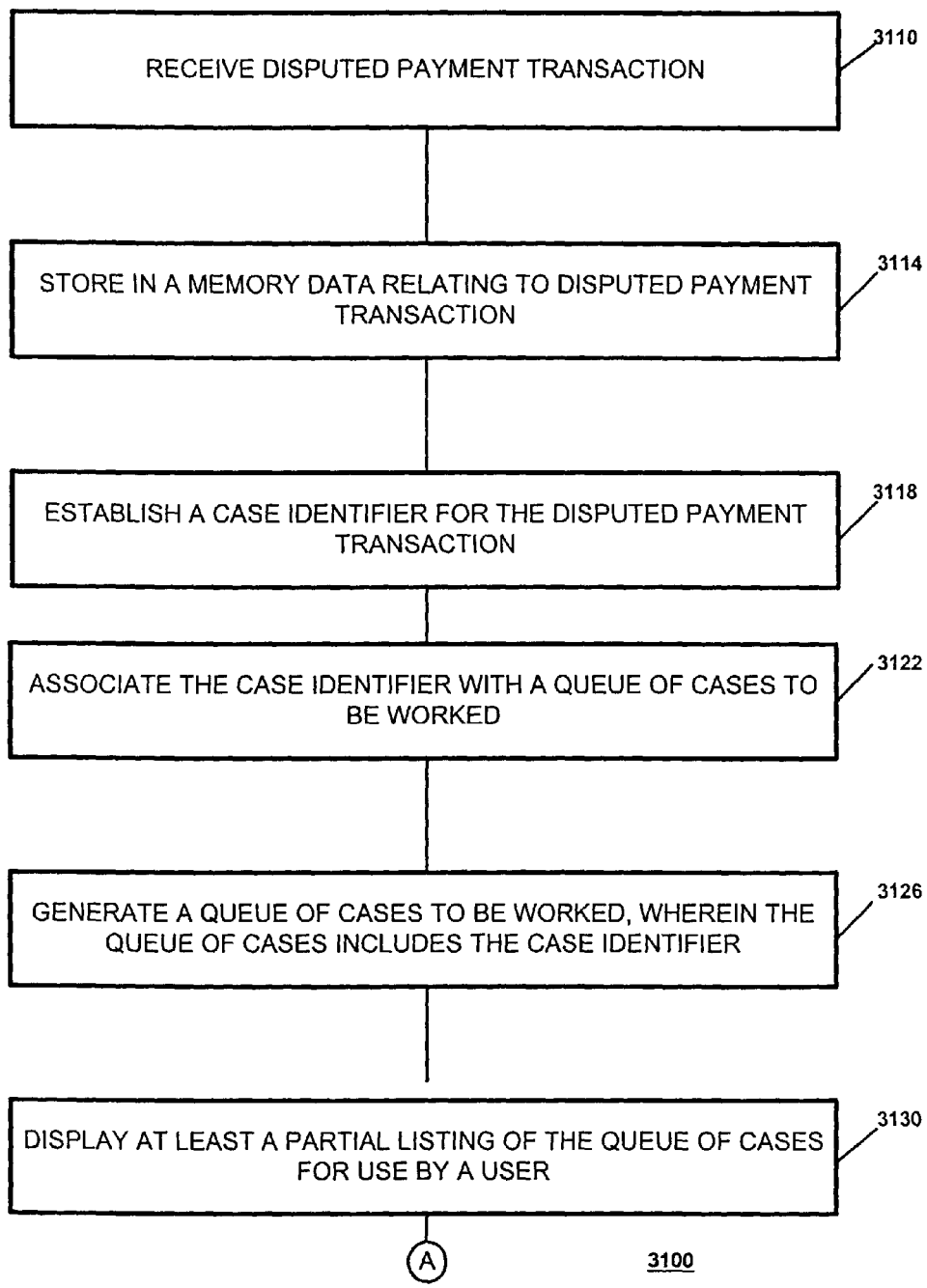
FIGS. 31a and 31b illustrate a flow chart demonstrating a method for generating a queue of cases according to one embodiment of the invention.
Figure 31B:
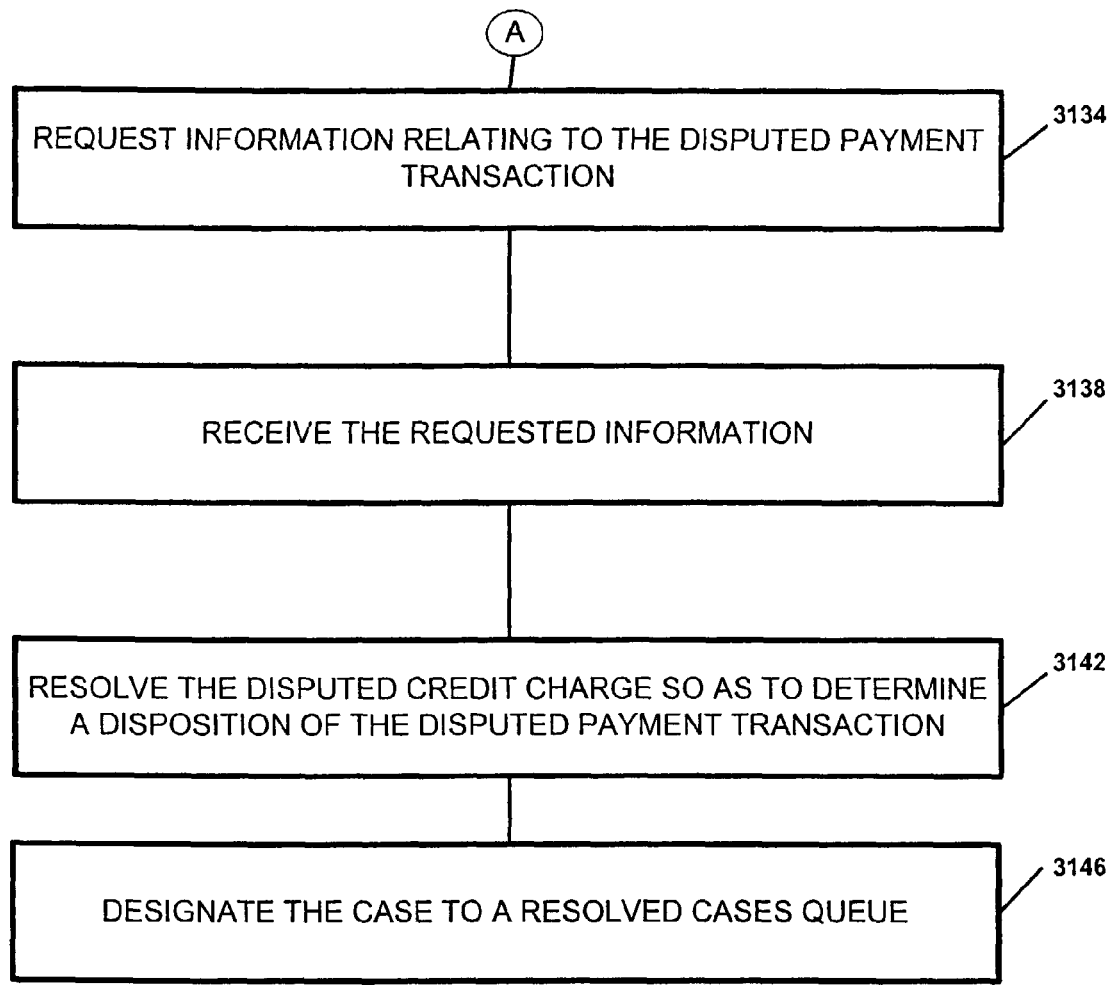

In order to establish a queue of cases to be worked by an investigator, a set of logic rules can be used to process the cases. One embodiment of the invention is thus illustrated in FIGS. 31*a* and 31*b* by flowchart 3100. In block 3110 of FIG. 31, a credit charge dispute is received. This might be received via any type of notification means, e.g., a telephone call, an email or a communication from a credit association such as Visa or Mastercard. Block 3114 shows that the data relating to the disputed credit charge is stored in a memory. A case identifier is associated with the disputed credit charge, as shown in block 3118. Thus, the case identifier can be used to identify the disputed credit charge within the processing system.

Block 3122 illustrates that a case identifier can be associated with queue of cases to be worked. One example of this is shown in more detail below in the description of FIG. 32. Namely, this determination allows a credit card dispute or retrieval request to be assigned to a particular queue for processing. In block 3126, a queue of cases to be worked is illustrated as an example of a queue that can be generated. If the case satisfies the profile of the generated queue, then the case will be included as part of the queue.

In block 3130 of FIG. 31, at least a partial listing of the generated queue of cases is displayed for use by a user (such as an investigator or merchant) as described above. Thus, in block 3134 the user can request information relating to the disputed charge. For example, the auditor can ask a merchant to supply a copy of the signed sales receipt. In blick 3138, requested information is shown as being received. One example of this would be the merchant submitting an electronic document showing an image of the signed sales receipt. Thus, the user can resolve the disputed credit charge so as to determine a disposition of the disputed credit charge, as shown in block 3142. Additionally, the user can designate that the case be moved to a different queue, for example, a resolved cases queue or a pending cases queue, as illustrated in block 3146. Typically, however, a case would be controlled so as to be in only one queue at any point in time.

Figure 32:
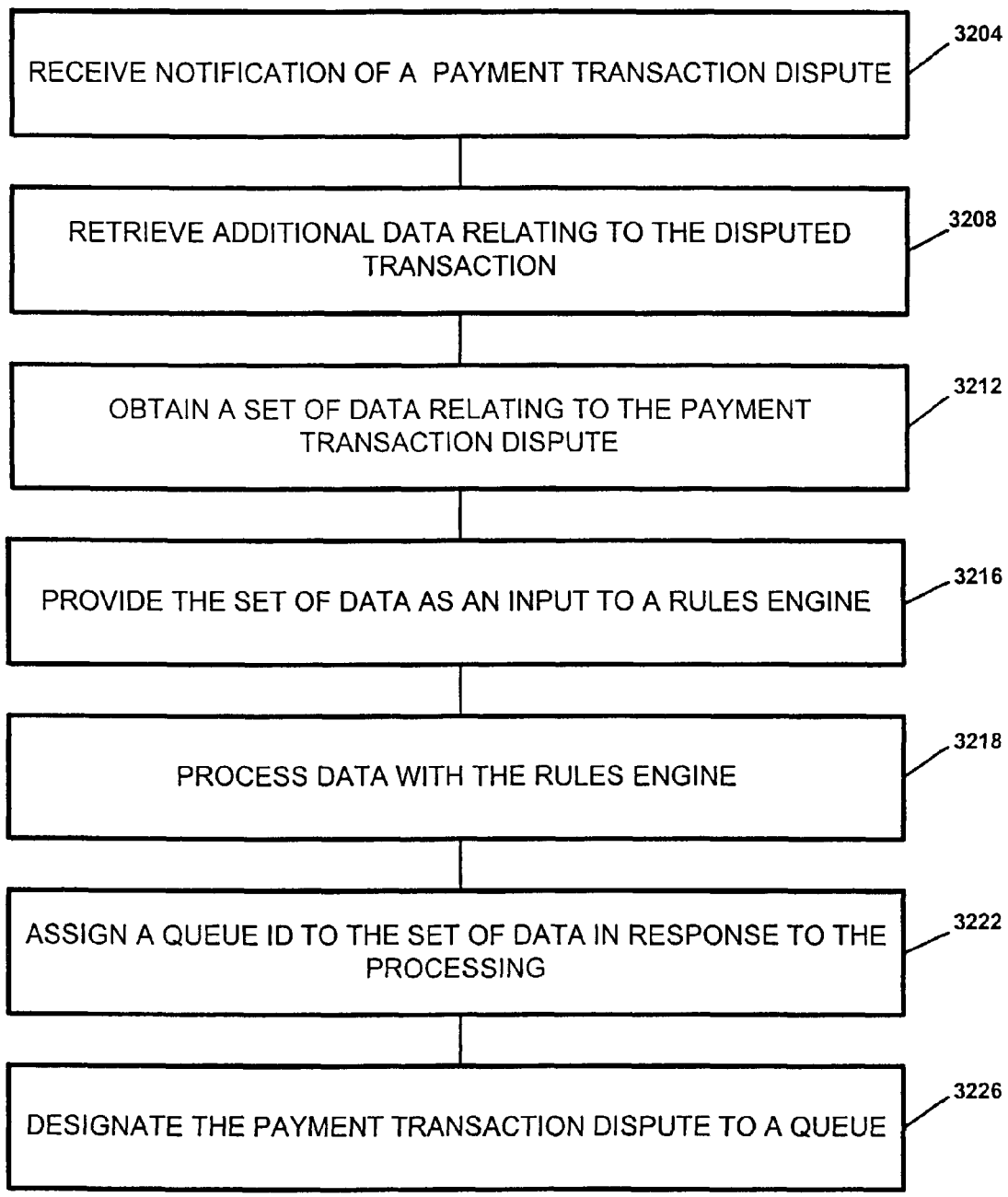
FIG. 32 illustrates a flow chart demonstrating a method for associating a set of data for a payment transaction with a processing queue, according to one embodiment of the invention.

FIG. 32 illustrates yet another embodiment of the invention. In FIG. 32, a notification is received of a credit dispute in block 3204. In block 3208, additional data relating to the disputed transaction is retrieved. For example, if cardholder John Smith disputes a transaction that appears on his Visa bill with a transaction date of Jun. 11, 2001, data for that transaction can be gathered to compile a more complete set of data. For example, the name of the merchant, the time of the purchase, the transaction identifier, etc. all can be gathered to enrich the set of available data for the disputed charge. All the data received and/or gathered for a transaction can then be compiled into a set of data relating to the credit dispute as shown in block 3212.

The set of data can then be submitted to a rules engine for automated processing, as shown in blocks 3216 and 3218. For example, a program of logical rules can be provided to sort data records into various queues depending on the data values in particular categories. Thus, if one desired to sort all of the data records that pertain to Merchant XYZ, a logical rule could be programmed to accomplish that sort. Similarly, one could sort by other logical rules, as well. If a data set is determined to be associated with a particular queue, a queue identifier can be associated with the data set, as shown in block 3222. Finally, once the processing takes place, the credit dispute can be designated to a particular queue, as shown in block 3226. Examples of fields that could be used to by the rules engine include: acquirer bank identification number (BIN)/ICA, dispute amount, dispute ID, dispute received data, domestic/foreign indicator, intra-indicator, issuer BIN/ICA, MCC code, merchant number, product code, reason code, system code, and work type.

Figure 33:
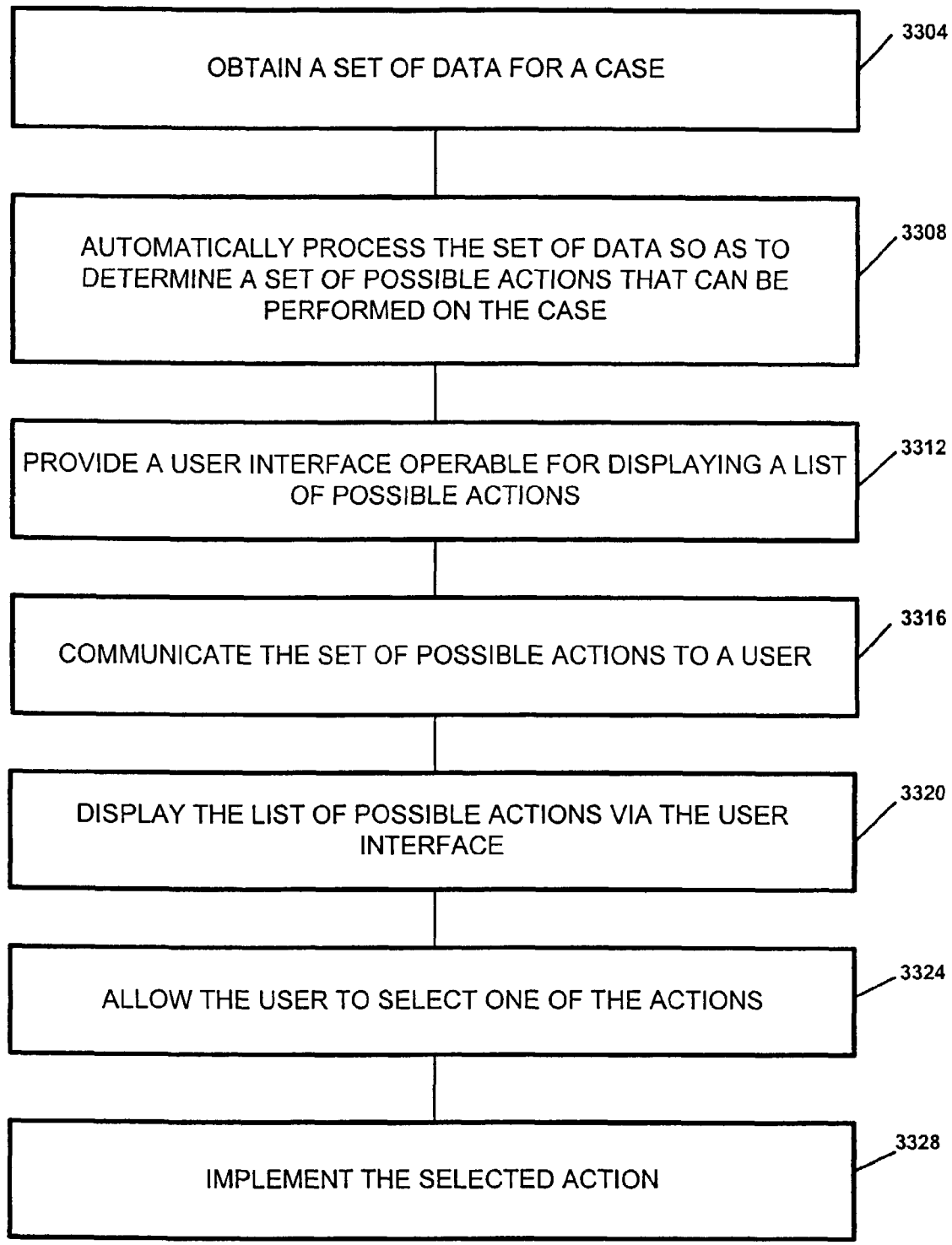
FIG. 33 illustrates a flow chart demonstrating a method for generating a set of possible actions to take on a set of data for a payment transaction dispute, according to one embodiment of the invention.

The user interface described above referenced that various actions could be taken on a case. For example, an investigator working a case could request additional information from an issuing bank, association or merchant. Similarly, for each action, sub-actions or "steps" could be taken. The actions available to a user of the user interface will vary depending on the data set that is involved. Only some actions will be available depending on the particular queue involved and the type of data available. Thus, FIG. 33 illustrates an embodiment of the invention that facilitates processing of the actions. For example, in flowchart 3300 of FIG. 33, a set of data is obtained for a case as shown in block 3304. This set of data is automatically processed so as to determine a set of possible actions that can be performed on the case, as shown in block 3308. A user interface is provided that is operable for displaying a list of possible actions, as shown in block 3312 and the set of possible actions is communicated to a user, as shown in block 3316.

Once a list of possible action is obtained, an entire listing or a partial listing of actions can be displayed via the user interface on a display area of the user interface, as noted in block 3320. A user may then select one of the actions, as illustrated by block 3324. Once an action is selected, it can be implemented, as noted in block 3328 of FIG. 33.

In generating the list of actions, a set of logical rules can be used. The logical rules might first be used to determine a list of all possible actions that can be performed based on a first characteristic of the data fields. Then, this list could be filtered so as to obtain a more refined set of possible actions.

Figure 34A:
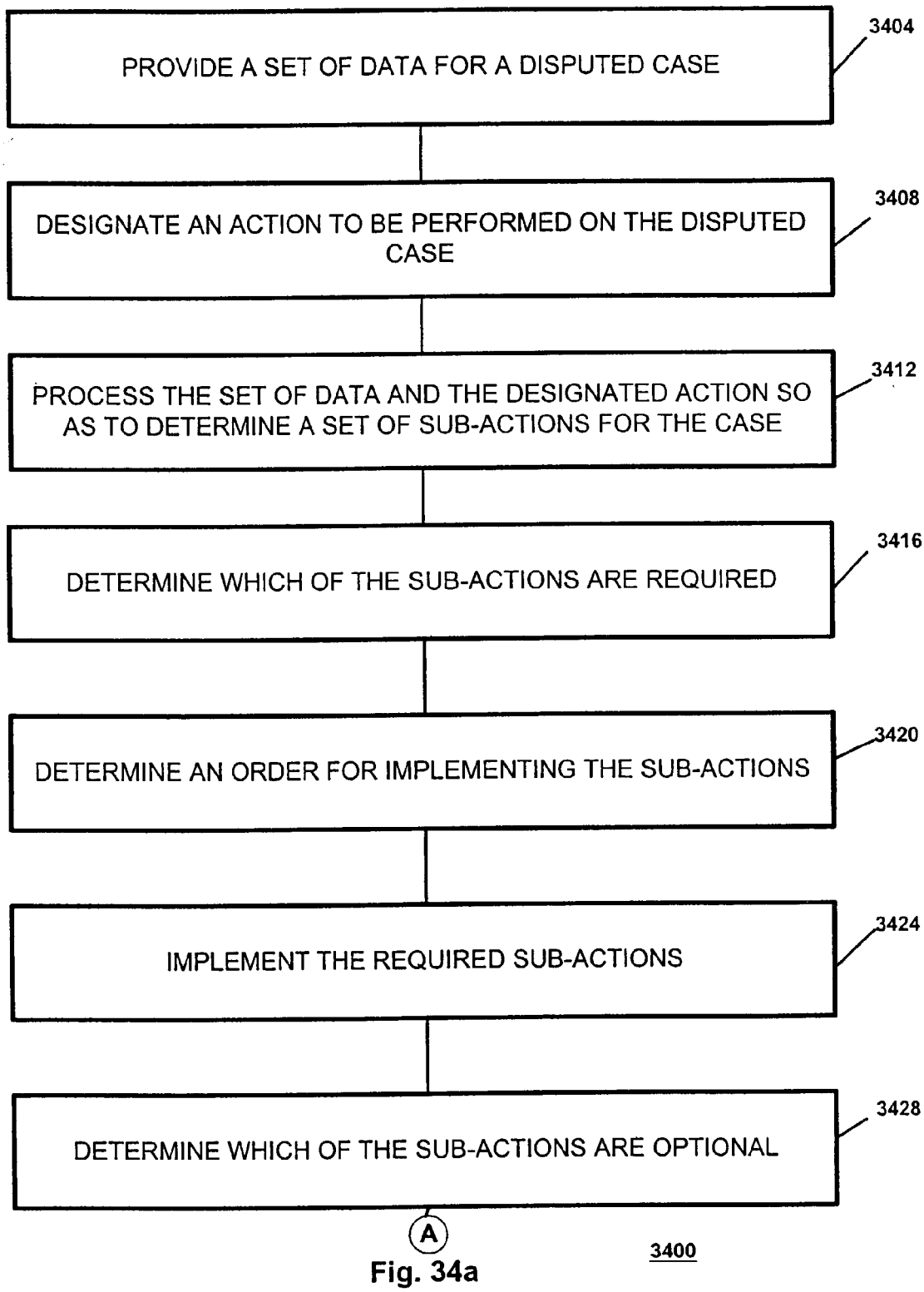
FIGS. 34a and 34b illustrate a flow chart demonstrating a method for generating a set of possible sub-actions to take for a particular action according to one embodiment of the invention.
Figure 34B:
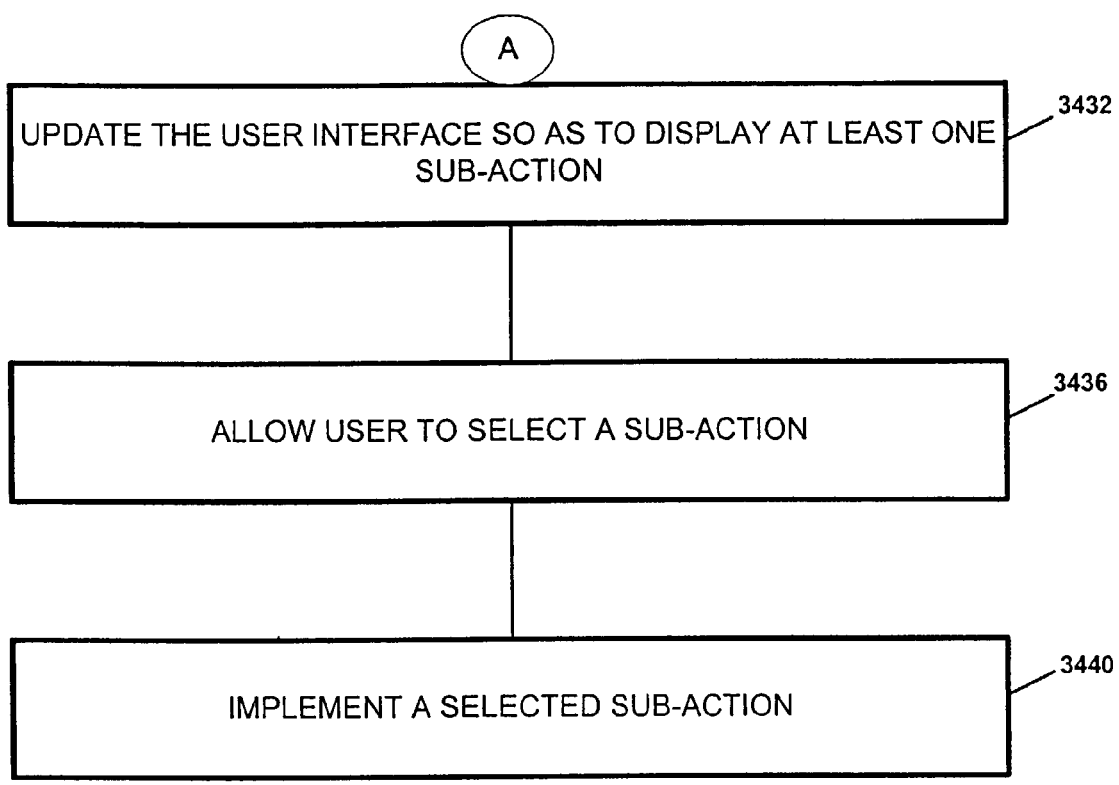

FIGS. 34a and 34b illustrate yet another embodiment of the invention. FIGS. 34a and 34b illustrate that the rules engine can be applied to the implementation of sub-actions of a particular action. In flowchart 3400, block 3404 illustrates that a set of data is provided for a disputed case. Block 3408 shows that an action to be performed on the disputed case is designated. Furthermore, block 3412 shows that the set of data and designated action are processed so as to determine a set of sub-actions for the case. As an example of this, for each action that can be performed on a set of data there is a series of sub-actions that can be performed to implement that action. Depending on the available data, some of the subactions will be required while others will only be optional. Similarly, some may be required to be performed while others will be optional. The rules engine can be used so as to determine which of the set of sub-actions is available, required, and/or optional. Thus, in the example of FIG. 34a and FIG. 34b, block 3416 determines which of the sub-actions are required. In block 3420, an order for implementing the sub-actions is determined. In block 3424, the required sub-actions are implemented; while in block 3428, a determination is made as to which of the sub-actions are optional.

In FIG. 34b, a user interface is updated so as to display at least one sub-action for a user's selection. Thus, in block 3436, a user is allowed to select one of these sub-actions, e.g., via a user interface. The order of displaying the sub-actions can be controlled by the logical rules, as well. Finally, block 3440 shows that a selected sub-action can be implemented by the program.

ASP Connections

As noted previously, one embodiment of the invention allows a user involved in the dispute process to access the centralized repository of dispute data via an application service provider (ASP). Thus, the user can establish a connection with the ASP software via a network such as over the Internet. Then, the user can use the ASP software in conjunction with the centralized repository of dispute information. This allows all of the users to access the same information for a case. Thus, the merchant and investigator can see and access the same documents when they access the case record.

In addition, some customers of the dispute processing center will choose to have their own representatives work the disputes. For example, company XYZ may choose to have an investigator work the disputes related to company XYZ's account. In such a case, the investigator can connect to the ASP over the internet and still obtain the same information that would be obtained if the investigator were working the case from the "back office" of the processing center itself.

In addition, the centralized system allows the processing center to acquire other processing centers and convert their data for storage in the centralized repository. For example, such records could be converted to an XML file so that the record can be updated to the centralized repository. This allows those records to be worked under the system discussed above using the common interface.

According to one embodiment of the invention, a DB2 database can be used to store the records for the various transaction dispute records. Similarly, a separate server can be used to store imaging data. A framework can then be used to link the merchant, the investigator, the DB2 database and the imaging server to allow access to the records needed by each party.

While various embodiments of the invention have been described as methods or apparatus for implementing the invention, it should be understood that the invention can be implemented through code coupled to a computer, e.g., code resident on a computer or accessible by the computer. For example, software and databases could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that embodiments of the invention also be considered protected by this patent in their program code means as well.

It is also envisioned that embodiments of the invention could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

It is also noted that many of the structures, materials, and acts recited herein can be recited as means for performing a function or steps for performing a function. Therefore, it should be understood that such language is entitled to cover all such structures, materials, or acts disclosed within this specification and their equivalents.

It is thought that the apparatuses and methods of the embodiments of the present invention and many of its attendant advantages will be understood from this specification and it will be apparent that various changes may be made in the form, construction, and arrangement of the parts thereof without departing from the spirit and scope of the invention or sacrificing all of its material advantages, the form herein before described being merely exemplary embodiments thereof.

What is claimed is:

1. A method of processing a payment transaction dispute at a dispute processor wherein said dispute processor processes transaction disputes between a cardholder of an issuer and a merchant of an acquirer, said method comprising:
   receiving at a dispute processor a payment transaction dispute generated by an issuer;
   obtaining for said dispute processor from an acquirer a set of data relating to said payment transaction dispute;
   providing said set of data as an input to a computerized rules engine;
   processing said set of data with said rules engine;
   designating said payment transaction dispute to a queue of said dispute processor based on the result of processing said set of data with said rules engine;
   forming a plurality of payment transaction disputes in said queue;
   regulating execution of a workload of a human investigator at said dispute processor via displaying only a partial listing of said second queue of cases for viewing by said human investigator so as to prevent said human investigator from selectively avoiding cases to work.

2. The method as described in claim 1 wherein said obtaining said set of data relating to said payment transaction dispute comprises:
   retrieving data from a computerized database, said data relating to details of said payment transaction dispute.

3. The method as described in claim 1 and further comprising:
   assigning a queue ID to said set of data in response to said processing.

4. The method as described in claim 3 wherein said designating said payment transaction dispute comprises sorting based on said queue ID.

5. The method as described in claim 1 wherein said processing said set of data with said rules engine comprises:
   applying a predetermined set of logical rules to said set of data.

6. The method as described in claim 1 wherein said processing said set of data comprises utilizing data selected from the group of categories of acquirer bank identification number, dispute amount, dispute identifier, issuer bank identification number, merchant number, product code, and reason code.

7. A method of processing a payment transaction dispute resolution case at a dispute processor wherein said dispute processor processes transaction disputes between a cardholder of an issuer and a merchant of an acquirer, said method comprising:
   receiving at a dispute processor a disputed transaction sent by an issuer;
   obtaining a set of data for said payment transaction dispute resolution case for use by said dispute processor;
   establishing for said dispute processor a queue comprising a plurality of disputed cases for resolution by a human investigator assigned to said queue;
   disposing said payment transaction dispute resolution case in said queue;
   automatically processing said set of data so as to determine a set of possible actions that can be performed on said case by said dispute processor for purposes of resolving said case;
   communicating said set of possible actions to said human investigator assigned to said queue;
   regulating execution of a workload of said human investigator via displaying only a partial listing of said queue for viewing by said human investigator so as to prevent said human investigator from selectively avoiding cases to work;
   obtaining data at said dispute processor from an acquirer for use in resolving said transaction dispute.

8. The method as described in claim 7 wherein said communicating said set of possible actions to said human investigator comprises providing a user interface wherein said user interface comprises a display area for displaying said set of possible actions.

9. The method as described in claim 7 wherein said automatically processing said set of data so as to determine said set of possible actions comprises:
   determining a total set of actions that can be performed;
   filtering out from said total set of actions, any actions which do not apply to the set of data.

10. The method as described in claim 8 and further comprising:
    allowing said human investigator to select an action from said set of possible actions.

11. The method as described in claim 7 and further comprising:
    displaying said set of possible actions via a user interface for selection by a user;
    determining when said user has selected one of said possible actions; and implementing said action selected by said user.

12. The method as described in claim 7 wherein said automatically processing comprises:
   utilizing a set of predetermined rules to operate on said set of data.

13. A method of processing a payment transaction dispute resolution case at a dispute processor wherein said dispute processor processes transaction disputes between a cardholder of an issuer and a merchant of an acquirer, said method comprising:
   providing a set of data for a disputed case, said disputed case submitted to a dispute processor from an issuer;
   establishing for said dispute processor a queue of disputed cases for resolution by a human investigator assigned to said queue;
   disposing said payment transaction dispute resolution case in said queue so as to provide a plurality of cases for resolution by said human investigator assigned to said queue;
   regulating execution of a workload of said human investigator via displaying only a partial listing of said queue for viewing by said human investigator so as to prevent said human investigator from selectively avoiding cases to work;
   designating an action to be performed on said disputed case by said dispute processor;
   processing said set of data and said designated action so as to determine a set of sub-actions that can be performed on said case;
   determining which of said sub-actions are required;
   determining which of said sub-actions are optional; and
   implementing said required sub-actions by said dispute processor;
   obtaining data at said dispute processor from an acquirer for use in resolving said transaction dispute.

14. The method as described in claim 13 and further comprising:
   determining an order for implementing said sub-actions.

15. The method as described in claim 13 and further comprising:
   determining an order in which to display said sub-actions to said human investigator via a user interface.

16. The method as described in claim 13 and further comprising:
   updating a user interface so as to display at least one sub-action.

17. The method as described in claim 13 and further comprising:
   utilizing a set of predetermined rules to process said set of data.

* * * * *